United States Patent [19]
Koscik

[11] 3,939,752
[45] Feb. 24, 1976

[54] FASTENER STRUCTURE

[75] Inventor: Richard A. Koscik, Richton Park, Ill.

[73] Assignee: Illinois Tool Works Inc., Chicago, Ill.

[22] Filed: Dec. 23, 1974

[21] Appl. No.: 536,936

[52] U.S. Cl. .................................................. 85/5 R
[51] Int. Cl.$^2$ ........................................ F16B 19/00
[58] Field of Search .................. 85/5 R, 80, DIG. 2; 24/73 P, 73 PF, 73 PM, 208 A

[56] References Cited
UNITED STATES PATENTS

| | | | |
|---|---|---|---|
| 3,485,133 | 12/1969 | Rapata | 85/5 R |
| 3,756,115 | 9/1973 | Schuplin | 85/5 R |

FOREIGN PATENTS OR APPLICATIONS

| | | | |
|---|---|---|---|
| 202,019 | 6/1956 | Australia | 85/DIG. 2 |

*Primary Examiner*—Ramon S. Britts
*Attorney, Agent, or Firm*—Olson, Trexler, Wolters, Bushnell & Fosse, Ltd.

[57] ABSTRACT

The embodiment of the invention disclosed herein is directed to a fastener structure which has a pair of spaced apart prongs extending from a head portion thereof for insertion through aperture means formed in a thin panel. The prongs extend from a head portion which is to be positioned on one side of the panel and have shoulder portions extending transversely thereof to engage the other side of the panel after the fastener is inserted into the panel. The prongs have a neck portion formed between the head portion and the shoulder portion to be in registry with the thickness of the panel after the fastener is in place. The neck portion has a varying cross-section, when viewed in a plane parallel to the panel, with a thin portion at one end of the neck and a thick portion at the other end of the neck for providing different degrees of flexure therealong. The prongs, as they are inserted through the panel, will flex and twist toward one another with the greatest degree of flexure taking place at the thin portions of the necks.

10 Claims, 7 Drawing Figures

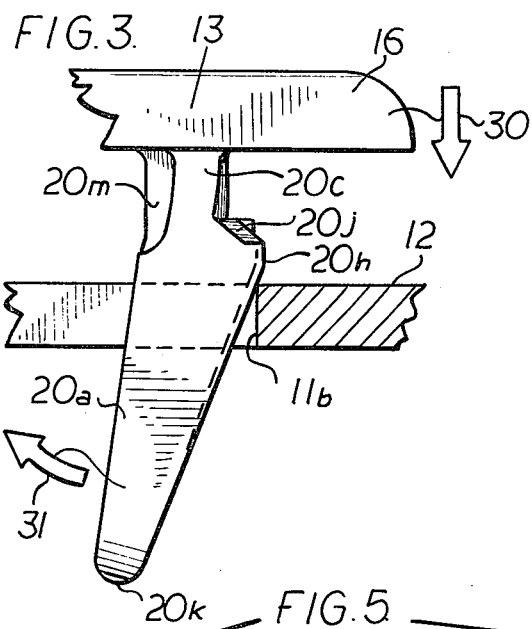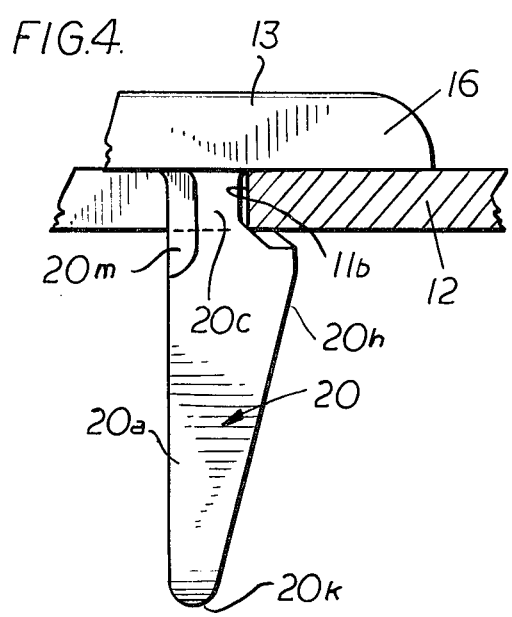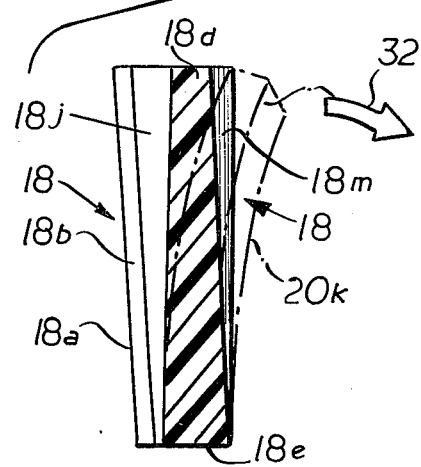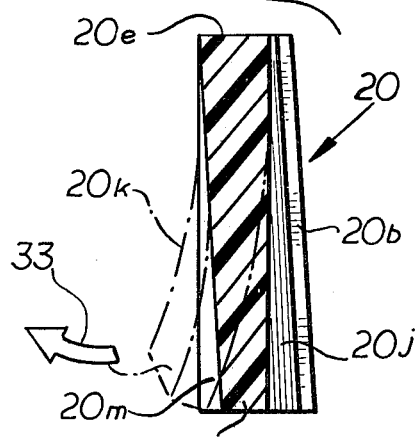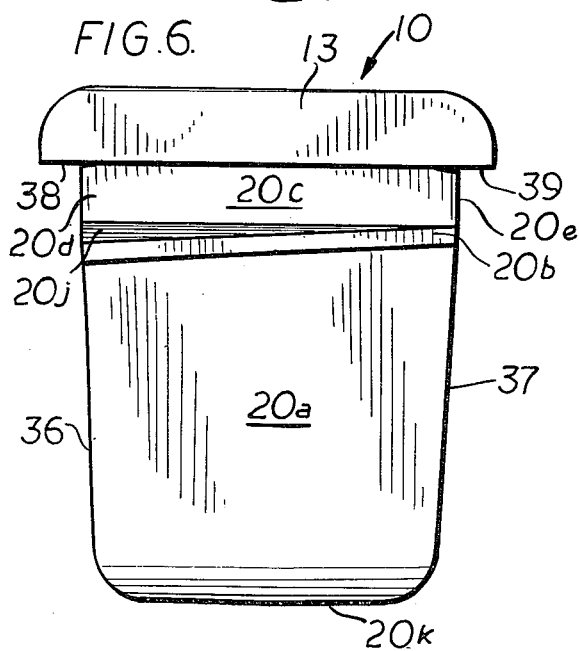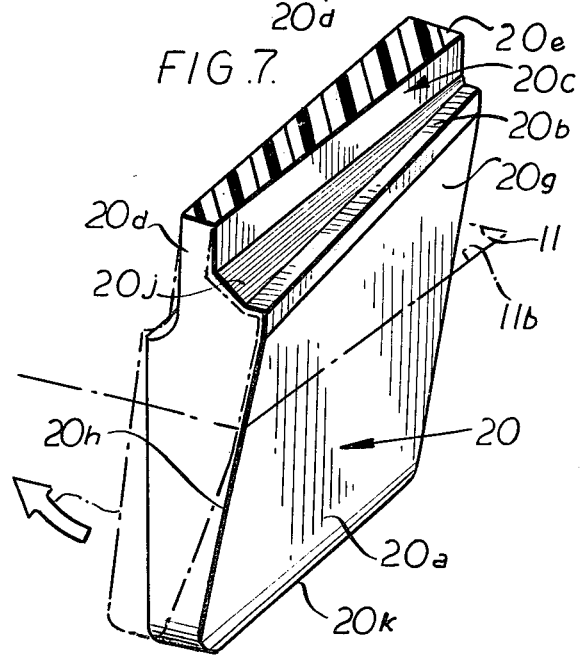

FASTENER STRUCTURE

This invention relates generally to fasteners, and more particularly, to fasteners for mounting articles on apertured panels without the necessity of access to both sides of the panels. The articles to be mounted by the fastener can be formed either integrally with the fastener or added thereto by other fastening means.

In applying emblems, letters, or other indicia to appliances and the like, and applying molding strips to automobiles, and in many other instances such as connecting windshield washer hole couplings to thin panels, it is impossible to attain access to the rear side of the panel. In other instances, it is undesirable to obtain access due to the difficulty of coordinating action simultaneously from two sides of the panel, and due to the extra time and manpower that is needed for acting on both sides of a panel. Heretofore, various fastener devices have been provided for fastening articles to an apertured panel, such fasteners generally being referred to as "blind" fasteners. Such fasteners of the prior art are sometimes difficult and expensive to manufacture, as well as providing some degree of difficulty when used. For example, for "blind" fasteners to hold securely when inserted through an aperture formed in a panel, prongs formed as part of the fastener are required to be relatively rigid after the prongs are inserted. To enable the fastener to be pushed through the aperture of the panel, the prongs must flex to a degree. The degree of flexure, therefore, it is to be maintained at a minimum if the fastener is to firmly grip the panel. However, this minimum flexure increases the force required to insert the prongs of the fastener through the panel.

SUMMARY OF THE INVENTION

Accordingly, it is an object of this invention to provide a new and improved fastener which has prongs formed thereon for insertion through a panel and which prongs are so configurated to increase the flexure thereof during insertion of the prongs through the panel while providing maximum rigidity of the prongs after the fastener is in position.

Briefly, the fastener of this invention includes a head portion which may carry a plug or an article manufactured directly or indirectly thereon. A pair of spaced apart prongs extend from the head portion for insertion through a rectangular aperture or spaced apart slot formed in a panel to receive the prongs. The prongs have body portions passing completely through the panel from one side thereof with shoulder portions extending transversely of the body portion to engage the other side of the panel after the prongs are inserted. A neck portion is formed between the head portion and the shoulder portion of the prongs to be in registry with the thickness of the panel. The neck portion, most advantageously, has a varying cross-section when viewed in a plane parallel to the panel with a thin portion at one end thereof and a thick portion at the other end thereof for providing varying degrees of flexure therealong. The neck portion will therefore flex and twist in a direction toward the center of the aperture as the body portion of the prongs engages the peripheral edges of the aperture while the prongs are inserted through the panel.

Many other objects, features and advantages of this invention will be more fully realized and understood from the following detailed description when taken in conjunction with the accompanying drawings wherein like reference numerals throughout the various views of the drawings are intended to designate similar elements or components.

BRIEF DESCRIPTION OF THE DRAWINGS

FIG. 3 illustrates the flexure and twisting action of the prongs as the body portion thereof engages the peripheral edge of the aperture during insertion;

FIG. 4 illustrates the fastener in position;

FIG. 5 is a sectional view taken along line 5—5 illustrating the flexure and twisting action of the prongs during insertion through the aperture of the panel of FIGS. 1, 2 and 3;

FIG. 6 is a side view of the fastener of this invention illustrating the construction of the prongs associated therewith; and FIG. 7 is a fragmentary perspective further illustrating the flexing and twisting action of the prongs as the fastener is inserted through a panel.

DETAILED DESCRIPTION OF THE ILLUSTRATED EMBODIMENT

Figure 1:
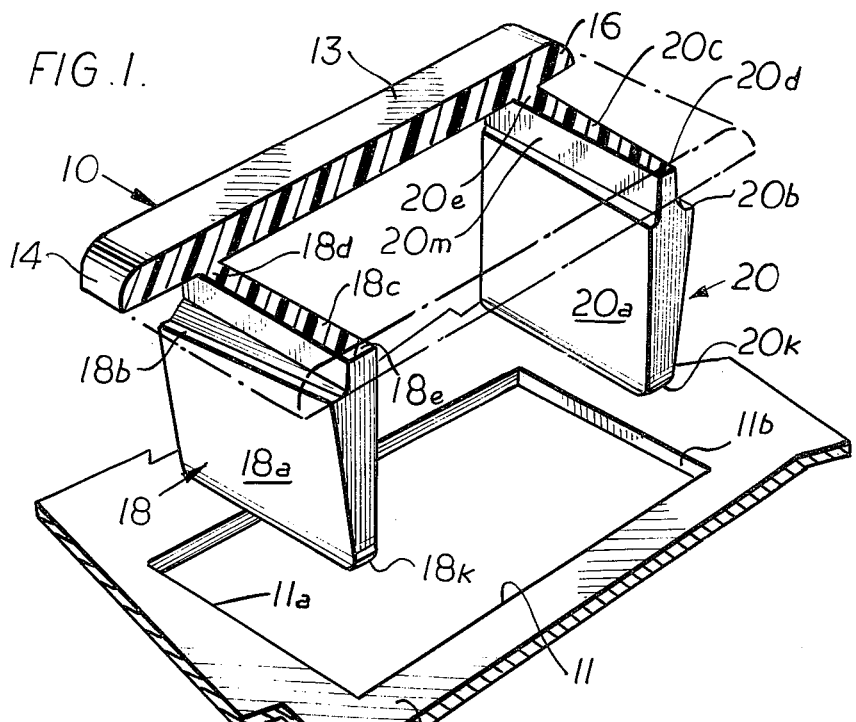
FIG. 1 is a perspective sectional view of a fastener constructed in accordance with the principles of this invention and shown in registry with an aperture formed in a panel into which the fastener is to be inserted.

Referring now to the drawings, there is seen a fastener constructed in accordance with the principles of this invention and designated generally by reference numeral 10. The fastener 10 is designed to be inserted into an aperture 11 of a panel 12 which may be formed of sheet metal, or the like. The panel 12 may be part of an appliance or an automobile. Furthermore, it will be understood that the single aperture 11 shown may be formed by two rectangular spaced apart slots if desired.

In the illustrated embodiment, the fastener 10 has a head portion 13 here being illustrated as a plug to cover the aperture 11. However, it will be understood that any article of manufacture may be formed as part of the head 13 either integral therewith or subsequently fastened thereto by adhesives or the like. Furthermore, it will be understood that emblems, letters or indicia may be formed as part of the head portion 13 or embossed thereon. The head portion is provided with end flanges 14 and 16 which extend beyond peripheral margins 11a and 11b of the aperture 11. Therefore, the head portion 13 of the plug completely conceals the aperture 11. Furthermore, it will be understood that the head portion 13 can be formed of transparent material and a light can be positioned behind the panel to form an indicating light or warning light if desired.

A pair of spaced apart prongs 18 and 20 are formed integral with the head 13 and extend therefrom to be inserted into the aperture 11 formed in the panel 12. The prongs 18 and 20 each include body portions 18a and 20a, respectively. The body portions 18a and 20a extend through the panel 12 so that shoulder portions 18b and 20b which are formed at the upper end of the body portion and extend transversely of the prongs, engage the opposite, or under-side, surface 21 of the panel 12. When inserted, flanges 14 and 16 of the head 13 engage the surface 22 of the panel and the fastener is firmly held to the panel, in a manner to be described in more detail hereinbelow. Neck portions 18c and 20c are formed as part of the prongs 18 and 20, respectively, and are arranged to be in registry with the thickness of the panel when the fastener is inserted through the aperture, as best seen in FIG. 4.

Most advantageously, the neck portions 18c and 20c have cross-sections, when viewed in a plane parallel to the surface of the panel 21 as seen in FIGS. 5 and 7 which vary in thickness from one end 18d, 20d of the neck portions to the other end 18e, 20e of the neck portions. For example, neck portion 18c has a thick portion 18e at one end and a thin portion 18d at the other end. Similarly, the neck portion 20c has a thin portion 20d at one end and a thick portion 20e at the other end. It will be understood that this arrangement can be reversed if desired. Furthermore, it will be noted that the thick portion 20e is at the opposite end of the prong than is the thick portion 18e of the opposite prong. However, the thin and thick portions of the prongs may be formed on the same side if desired.

Figure 2:
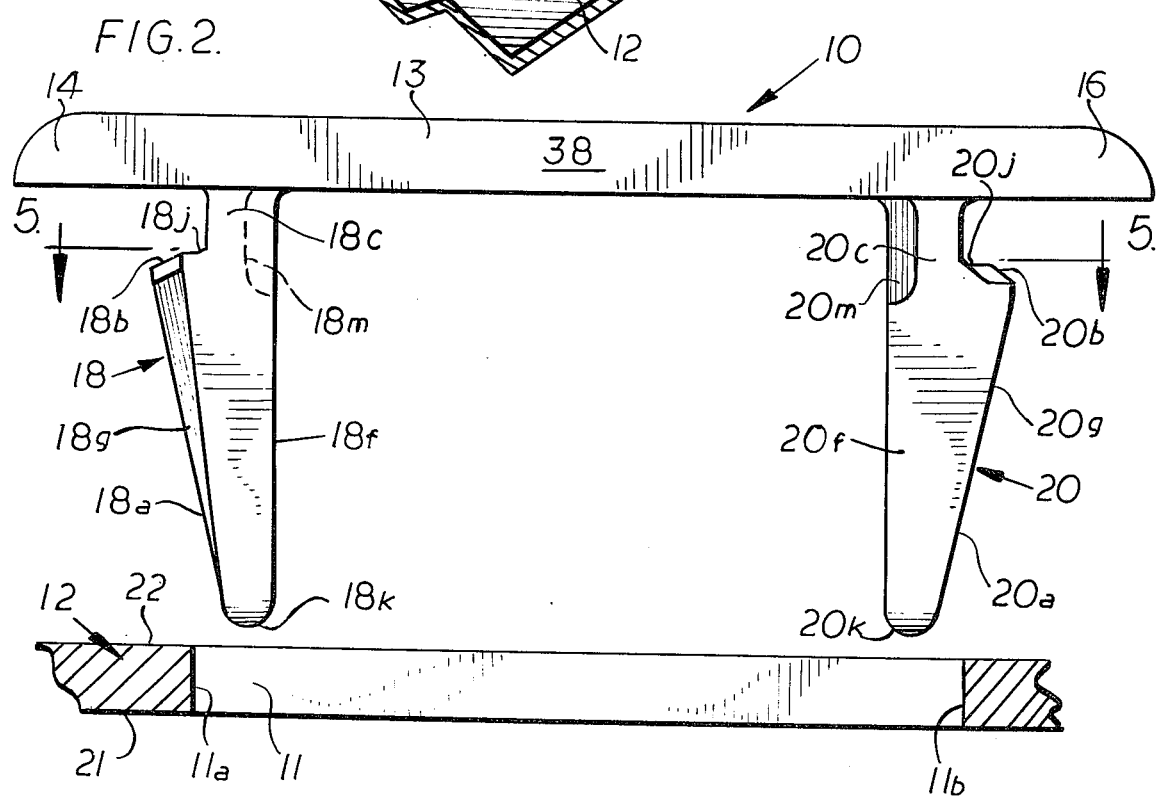
FIG. 2 is a side view of the aperture and panel illustrating the configuration of prongs formed on the fastener.

The prongs 18 and 20 have their inner wall surfaces 18f and 20f substantially parallel to one another and to the sides 11a and 11b of the aperture 11, as best seen in FIG. 2. However, the outward facing wall surfaces 18g and 20g are angled relative to their inner wall surfaces, and relative to the peripheral edges 11a and 11b of the aperture 11. This is a compound angle or taper sloping both away from the edges 11a and 11b and downwardly to form thin tip portions 18k and 20k. As best seen in FIG. 7, the wall portion 20g has one end 20h, immediately beneath the thin portion 20d, engaging the peripheral edge 11b of the aperture 11 before the rest of the prong comes in contact therewith as it is inserted. As the fastener is urged in the direction indicated by the arrow 30, of FIG. 3, the prong 20 is flexed and twisted, as indicated by the arrows 31, 32 and 33 of FIGS. 3 and 5, to reduce the force necessary for inserting the prong into the aperture. After the neck portion 20c is in registry with the thickness of the panel 12, the prongs 18 and 20 will snap back into their neutral position, as seen in FIG. 4.

FIGS. 3 and 5 best illustrate the dynamic condition occurring during insertion of the prongs 18 and 20 into the aperture 11. It will be noted that prong 18 flexes inwardly and twists arcuately as indicated by the arrow 32 while prong 20 flexes inwardly and twists arcuately as indicated by the arrow 33. Therefore, opposite corners of the prongs will flex toward one another. Therefore, the prongs twist in diametrically confronting directions, here being illustrated in a clockwise direction. However, the opposite corners may be made to flex if desired.

Gripping surfaces 18j and 20j are formed along the shoulders 18b, 20b and the neck portions 18c, 20c respectively. The slanted gripping surface is formed of compound angles and provides means for compensating for slight changes in the overall thickness of the panel 12 as well as for compensating in variations in the dimension between the peripheral margins 11a and 11b. Therefore, after the fastener is inserted into the aperture, the gripping surface will insure that the connection of the fastener to the panel is a solid and substantially non-shiftable one. The neck portions 18c and 20c also include angled undercuts 18m and 20m respectively formed on the opposite side of the shoulder portions 18b and 20b. Therefore, the portion of the necks facing the edges 11a and 11b are straight to make firm and complete contact with the edges of the aperture. The varying thickness of the necks is formed, therefore, by the angled undercuts 18m and 20m on the backside of the prongs. However, it will be understood that the varying thickness of the necks can be formed by angling the side adjacent the shoulder.

To further facilitate ease of insertion of the fastener 10 into the aperture 11, the edges of the prongs are tapered, as indicated by reference numerals 36 and 37 in FIG. 6. Also, it will be noted that flange portions 38 and 39 are formed integral with the head and, together with the flange portions 14 and 16, completely overlie the peripheral margin of the aperture 11. The degree of flexure and twisting shown through the drawings is exaggerated to facilitate explanation of the invention.

While a single specific embodiment of the invention has been illustrated herein, it will be understood that variations and modifications may be effected without departing from the spirit and scope as set forth in the following claims.

The invention is claimed as follows:

1. A device for insertion into a bi-sided panel, comprising: a head portion, a pair of spaced apart prongs extending from said head portion for insertion through aperture means formed in said panel, at least one of said prongs including a body portion for passing completely through said panel from one side thereof, a shoulder portion extending transversely of said body portion to engage an opposite side of said panel when said prong is inserted therethrough, a neck portion extending between said head portion and said shoulder portion and of a length corresponding to the thickness of said panel, said neck portion having a tapering cross-section, when viewed in a plane parallel to said panel, from a thin neck edge to a thick neck edge for providing different degrees of flexure from the thin neck edge to the thick neck edge, whereby said neck portion will flex inwardly and twist arcuately about one neck edge inwardly of the periphery of said aperture means during assembly of the device with the panel for facilitating passage of the shoulder portion beneath the panel.

2. A device as set forth in claim 1, wherein said neck portion cross-section tapers linearly from a relatively thick dimension adjacent said one edge to a relatively thin dimension adjacent said opposite edge.

3. A device for insertion into a panel as set forth in claim 1 further including a gripping surface angularly disposed between said neck portion and said shoulder portion for providing a varying distance between said head portion and said gripping surface along said neck portion for compensating for variations in thickness of said panel.

4. A device for insertion into a panel as set forth in claim 2 wherein said prong body portion is thickest in the region of the thin neck edge and thinnest in the region of said thick neck edge.

5. A device for insertion into a panel as set forth in claim 2 wherein said shoulder portion is tapered along its extent for providing a varying distance between said head portion and said shoulder portion.

6. A device for insertion into a panel as set forth in claim 5 wherein said shoulder tapers from a small edge in the region adjacent said thick neck edge to a large edge in the region adjacent said thin neck edge.

7. A device for insertion into a bi-sided panel, comprising: a head portion, a pair of spaced apart prongs extending from said head portion for insertion through aperture means formed in said panel, at least one of said prongs including a body portion for passing completely through said panel from one side thereof, a shoulder portion extending transversely of said body portion to engage an opposite side of said panel when said prong is inserted therethrough, a neck portion formed between said head portion and said shoulder portion and of a length corresponding to the thickness of said panel, said neck portion providing different degrees of flexure therealong, whereby said neck portion will flex and twist inwardly of the periphery of said aperture means with a maximum flexure taking place at one edge of said neck portion and a minimum flexure taking place at an opposite edge of said neck portion, and said prong body portion being thickest in the region of maximum neck flexure and thinnest in the region of minimum neck flexure for facilitating passage of said prong shoulder portion beneath said panel.

8. A device for insertion into a panel as set forth in claim 7 further including a gripping surface angularly disposed between said neck portion and said shoulder portion for providing a varying distance between said head portion and said shoulder portion to compensate for variations in thickness of said panel.

9. A device for insertion into a panel as set forth in claim 7 wherein said shoulder portion is inclined to provide a varying distance between said head portion and said shoulder portion.

10. A fastener for insertion into a panel as set forth in claim 7 wherein said shoulder portion is closest said head portion in the region of minimum neck flexure and furthest from said head portion in the region of maximum neck flexure.

* * * * *